(12) United States Patent
Stroshane

(10) Patent No.: US 12,128,258 B1
(45) Date of Patent: Oct. 29, 2024

(54) DESCENT CONTROL DEVICE

(71) Applicant: Sherrill, Inc., Greensboro, NC (US)

(72) Inventor: Alexander P Stroshane, Gorham, ME (US)

(73) Assignee: Sherrill, Inc., Greensboro, NC (US)

( * ) Notice: Subject to any disclaimer, the term of this patent is extended or adjusted under 35 U.S.C. 154(b) by 0 days.

(21) Appl. No.: 18/740,015

(22) Filed: Jun. 11, 2024

Related U.S. Application Data

(63) Continuation of application No. 18/644,349, filed on Apr. 24, 2024, now abandoned.

(60) Provisional application No. 63/498,086, filed on Apr. 25, 2023.

(51) Int. Cl.
*A62B 1/14* (2006.01)
*F16D 63/00* (2006.01)

(52) U.S. Cl.
CPC .............. *A62B 1/14* (2013.01); *F16D 63/008* (2013.01)

(58) Field of Classification Search
CPC ..................................................... F16D 63/008
See application file for complete search history.

(56) References Cited

U.S. PATENT DOCUMENTS

| | | |
|---|---|---|
| 5,054,577 A | 10/1991 | Petzl et al. |
| 5,360,083 A | 11/1994 | Hede |
| 6,378,650 B2 | 4/2002 | Mauthner |
| 6,732,833 B2 | 5/2004 | Rogelja |
| 6,902,031 B2 | 6/2005 | Ador |
| 7,658,264 B2 | 2/2010 | Mauthner |
| 8,733,504 B2 | 5/2014 | Mauthner |
| 9,415,245 B2 | 8/2016 | Codega |
| 10,035,028 B1 | 7/2018 | Siegel |
| 10,384,083 B2 | 8/2019 | Bell |
| 10,682,535 B2 | 6/2020 | Chabod et al. |
| 10,716,960 B2 | 7/2020 | Chamontet et al. |
| 10,987,525 B2 | 4/2021 | Kils et al. |
| 10,987,526 B2 | 4/2021 | Codega et al. |
| 11,071,879 B2 | 7/2021 | Chabod et al. |
| 11,097,136 B2 | 8/2021 | Malcolm |
| 2014/0262610 A1 | 9/2014 | Oddou et al. |
| 2017/0113072 A1* | 4/2017 | Sepe ................ F16D 63/008 |
| 2017/0260762 A1* | 9/2017 | Ostrobrod ........... E04G 21/3204 |

(Continued)

FOREIGN PATENT DOCUMENTS

| | | | | |
|---|---|---|---|---|
| CN | 10112643 B | * | 7/2010 | |
| EP | 2301631 A1 | * | 3/2011 | ............... A62B 1/14 |
| GB | 2518573 A | * | 3/2015 | ............... A63G 21/22 |

*Primary Examiner* — Melody M Burch

(74) *Attorney, Agent, or Firm* — Altman & Martin; Steven K. Martin

(57) ABSTRACT

A descent device for controlling descent on a rope having a housing, a cam, a lever, a linkage, a brake, and an eye. The housing is a pair of opposed plates separated by spacers, three of which operate as axles for the cam, lever, and brake. The cam has a rope track that extends around the perimeter of the cam at least 540° but not more than about 650°. A hump in the rope track forms a pinch point with a housing spacer. The lever rotates the cam via a linkage between a payout position where the rope can move freely through the device, a braking position where the rope is pinched at the pinch point and a cleat of the brake moves lightly to the rope, and a panic position where the rope is pinched by the brake cleat.

12 Claims, 19 Drawing Sheets

(56) References Cited

U.S. PATENT DOCUMENTS

2018/0154190 A1 6/2018 Chabod
2019/0351264 A1 11/2019 Ratalino

* cited by examiner

DESCENT CONTROL DEVICE

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to descending a rope, more particularly, to a device for controlling a user's descent down a rope.

2. Description of the Related Art

Firefighters routinely enter burning buildings to search for victims and locate the source of the fire. In the event that they cannot exit the way they entered, many are outfitted with emergency escape systems that allow them to exit through a window or from the roof. The systems are a last resort and rarely deployed but must be carried, specifically in an easy to access pocket or bag. The systems typically include a hook-like anchor, rope, descent device, and carabiner to connect the descent device to the belt or harness of the firefighter.

When the system is deployed, the anchor is first used to securely attach the rope to the structure or apparatus. The descent device initially locks in place along the rope to support the weight of the firefighter, but then enables the user to descend to safety by partially releasing its hold on the rope. In some currently available devices, it can be difficult to smoothly regulate the speed of descent, which may lead to the user feeling panicked if they begin sliding too quickly along the rope.

Because the system can be anchored in a variety of ways to the available structural members, it is sometimes necessary for the firefighter to move horizontally from the anchor location to the window being used as an exit point. The descent device must allow the user to manually feed out rope as they move, while still locking again automatically once the user has exited the window. Existing devices typically require careful manipulation to accomplish this, which can be a challenge while wearing thick gloves amid the heat and smoke.

Once the firefighter has exited the window, if there is not sufficient slack in the rope, it is possible for the descent device to become trapped against the windowsill or other part of the structure. The tension on the rope, from supporting the weight of the user, can make it difficult or impossible to operate the device in this condition. The firefighter must attempt to knock or twist the device in order to re-orient it to an operable position.

BRIEF SUMMARY OF THE INVENTION

The present invention is a descent device for controlling descent on a rope from height. The device has a housing, a cam, a lever, a linkage, a brake, and an eye.

The housing holds all of the other components and includes a pair of opposed, parallel plates spaced apart and attached together by four spacers, referred to as the cam axle, lever axle, brake axle, and pinch spacer. The plates define an A side and a B side of the housing. The plates are shaped as curvilinear triangles which is intended to help the device to keep from being trapped against a windowsill or similar obstruction.

The cam is a generally circular disc with a number of features. For later reference, the top of the cam is the pinch side because it is adjacent to the pinch spacer.

The cam has a rope track that extends around the perimeter of the cam at least 540° but not more than about 650°. A pinch end of the rope track is on the pinch side adjacent to the A side of the cam. Approximately 5° to 20° from the pinch end, the A side rope track bumps outwardly to form a hump. The hump and the pinch spacer define a pinch point. From the hump, the A side rope track extends around the cam adjacent to the cam A side for approximately 240° to 280°. Over the next approximately 80° to 100°, the rope track crosses over to the B side. The B side rope track extends around the perimeter of the cam B side for approximately 130° to 170° to a nose that, over the next approximately 110° to 140°, to a nose end, juts radially out from the perimeter approximately 30% to 70% of the radius of the cam. The nose eases the transition between the straight rope path coming from above to the rope wrapping around the cam to reduce stress on the rope.

The rope is retained on the rope track by the plates. A ridge separates the A side rope track from the B side rope track 110b to retains the rope on the track, thereby preventing the rope from crossing over itself.

The cam is mounted to rotate inside the housing perimeter the cam axle. The cam axle hole is offset from the center by about one half the radius at approximately 80° to 110° from the pinch end opposite the nose end. The hole offset causes the cam to rotate when there is tension on the rope.

The lever has a handle that curves away from a hub and controls the operation of the device. The lever rotates on the lever axle between the plates between a payout position where the handle generally aligns with the housing perimeter, a braking position where the handle is rotated out of the housing, and a panic position where the handle is rotated to a panic stop. The lever is biased by a spring towards the payout position at the housing perimeter.

The linkage extends between the lever and the cam. A round lever hole adjacent to the linkage lever end fits onto a cylindrical stud on the lever hub that is offset from the center of the hub. A cam slot at the linkage cam end fits onto a stud on the cam that is offset from the center of the cam axle hole.

The brake has a generally oval body. One end of the body is a rounded cleat that creates a cleat gap with the A side rope track just before the crossover. A finger extends from the body opposite the cleat and extends outside of the housing. The brake is mounted to rotate on the brake axle that is located offset from the center of the body away from the cleat. The brake is biased by a spring such that the cleat is biased towards the cam.

A spacer extending from the B side of the body keeps the body properly aligned with the A side rope track. The spacer has an eccentric shape about the brake axle that operates as a cam to keep the cleat from becoming jammed against the rope.

The eye provides a hook up point for a carabiner or the like and is mounted by a pivot hole to pivot on the lever axle. An attachment hole provides the hook up point.

The main purpose of the device is to control the descent of a person on a rope that is fixed to an anchor point above. The device provides control over a person's descent through different positions of the handle.

The rope takes a path through the device coming up from below. The rope wraps around the pinch spacer, through the pinch point, around the A side rope track, crosses over to the B side rope track, around to the nose, where the rope straightens out through the nose gap between the cam and brake spacer.

In the payout position, the pinch point is at its widest and the cleat is moved away from the rope, so that the rope is not impeded and the device can move freely on the rope.

In the braking position, a person is attached to the device at the eye attachment hole, thereby pulling the eye. Because of the connection between the eye and lever, the lever is pivoted out of the housing, causing the linkage to rotate the cam. This has two effects. First, the hump is aligned with the pinch spacer, causing the pinch point to narrow so that the rope is pinched therebetween. Second, the brake spring is no longer prevented from pivoting the brake cleat to lightly contact the rope in preparation to engage the rope, if necessary.

As the user pulls the handle downwardly, the cam rotates counterclockwise, widening the pinch point, thereby lessening the pinching of the rope. The user can control the descent by how much the handle is pulled downwardly.

If the handle is pulled all the way down, the rope is pinched between the cam and the brake cleat, thereby slowing descent.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
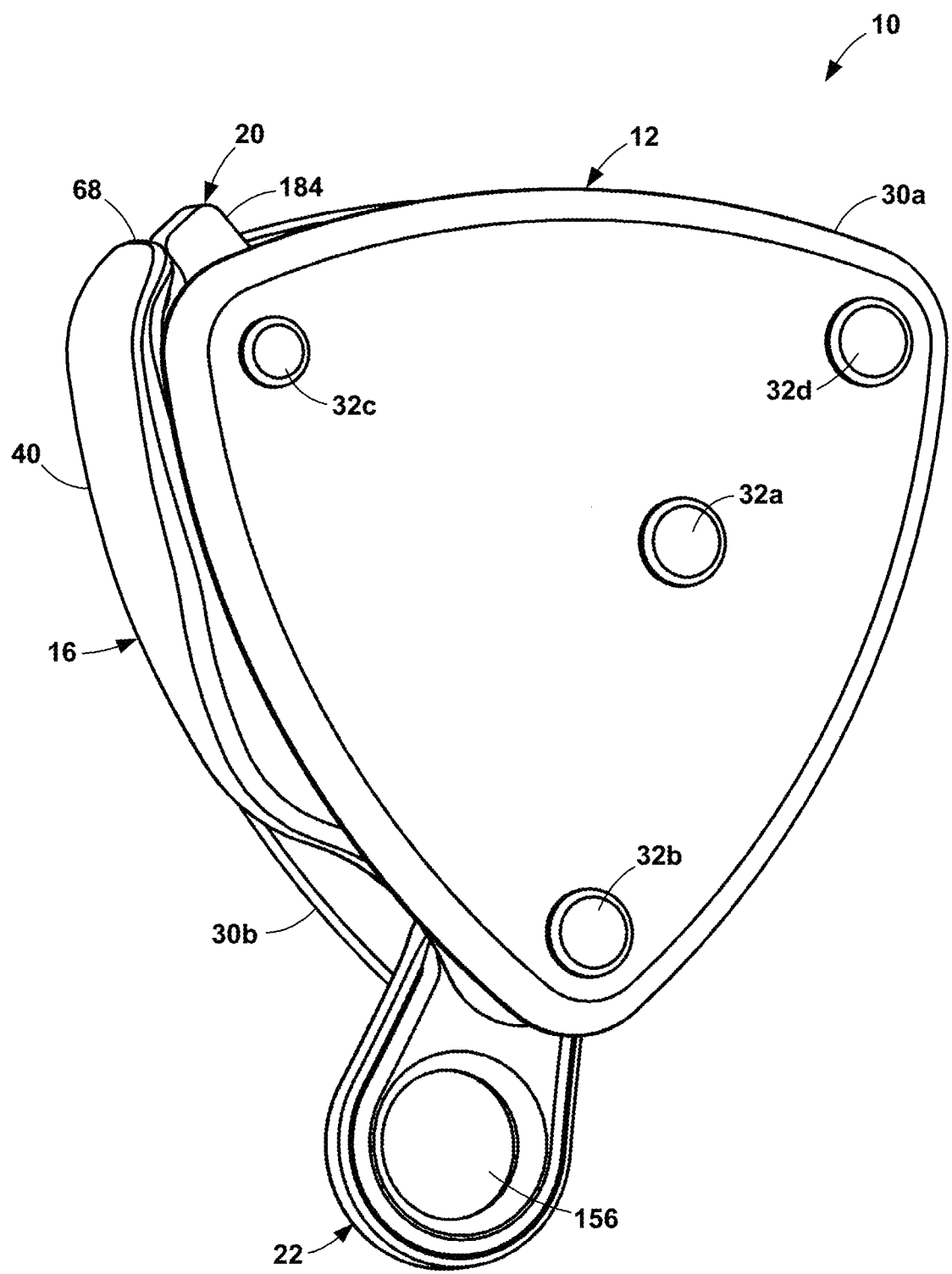
FIG. 1 is a perspective view of the device of the present invention.
Figure 2:
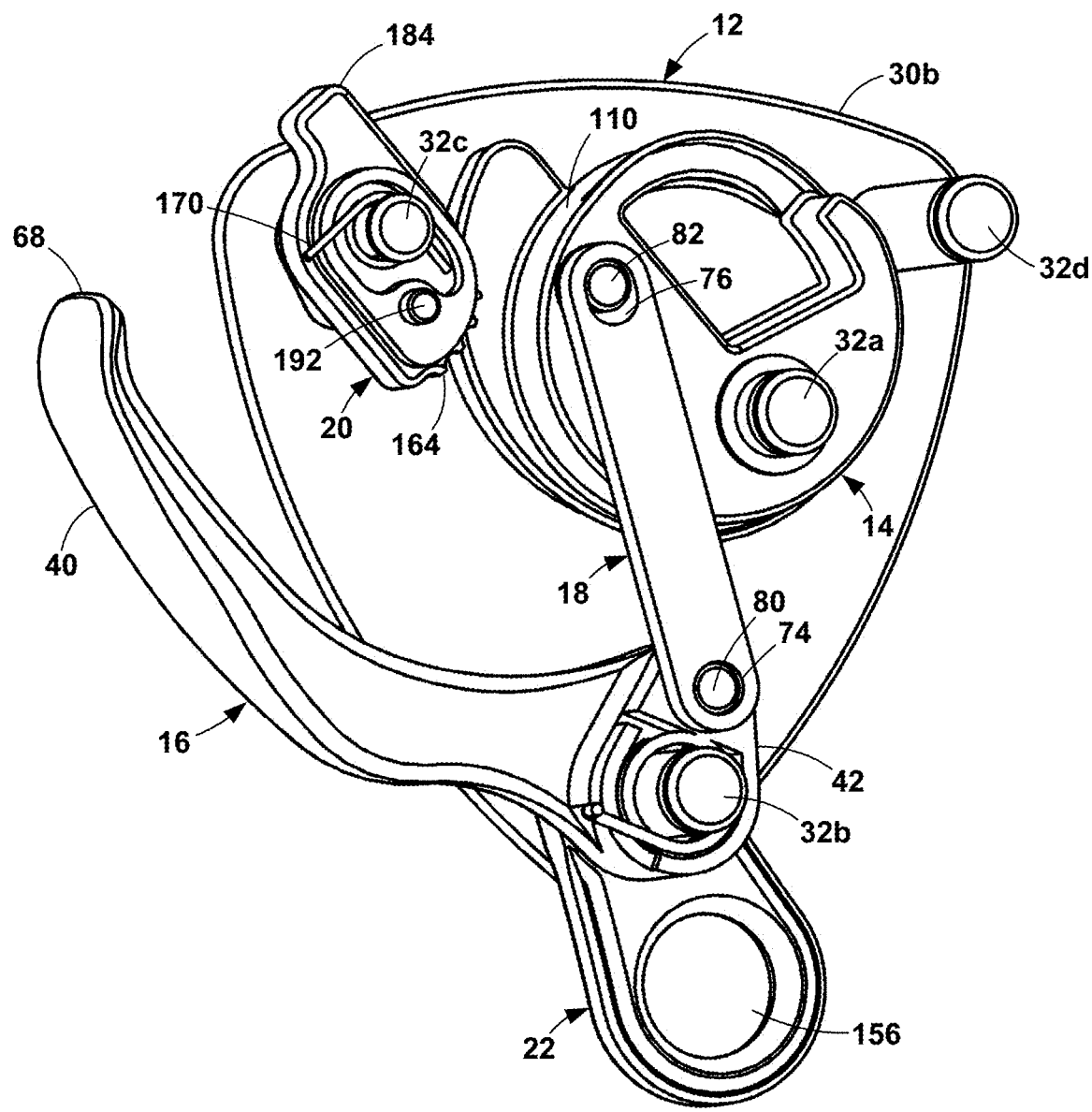
FIG. 2 is a perspective view of the device without the A side plate.

The present application is a continuation of U.S. patent application Ser. No. 18/644,349 which claims the benefit of U.S. Provisional Patent Application No. 63/498,086, both of which are hereby incorporated by reference in their entireties.

The present invention is a descent device for controlling descent from height, such as a tree or a building. The descent device provides the ability to control a user's descent on a rope. The device has six main components, a housing 12, a cam 14, a lever 16, a linkage 18, a brake 20, and an eye 22.

The housing 12 holds all of the other components in correct relation to each other. The housing 12 includes a pair of opposed, parallel plates 30a, 30b (collectively, 30) that are spaced apart and attached together by at least four spacers 32a, 32b, 32c, 32d (collectively, 32). As described below, three of the spacers 32a, 32b, 32c operate as axles on which other components rotate and a fourth spacer 32d operates as one side of a pinch point 222. Any additional spacers 32 operate only as spacers. The spacers 32 are all parallel to each other and perpendicular to the plates 30.

The spacers 32 are secured to the plates 30 in any number of ways known in the art, including swaging, C-clips, welding, adhesives, press fit, screws, etc. For some of the securing methods, the spacers 32 extend through and are retained in through holes 34 in the plates 30.

Figure 3:
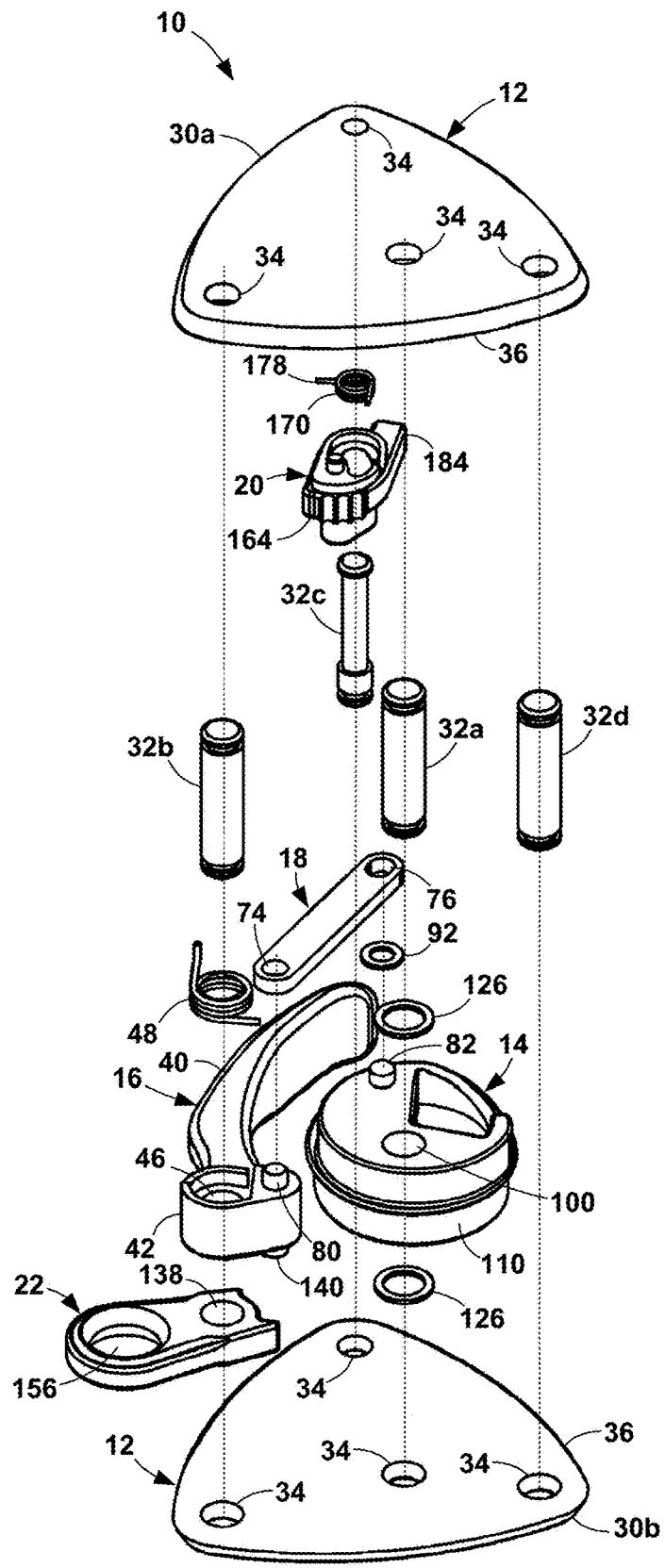
FIG. 3 is an exploded view of the device with the A side up.
Figure 4:
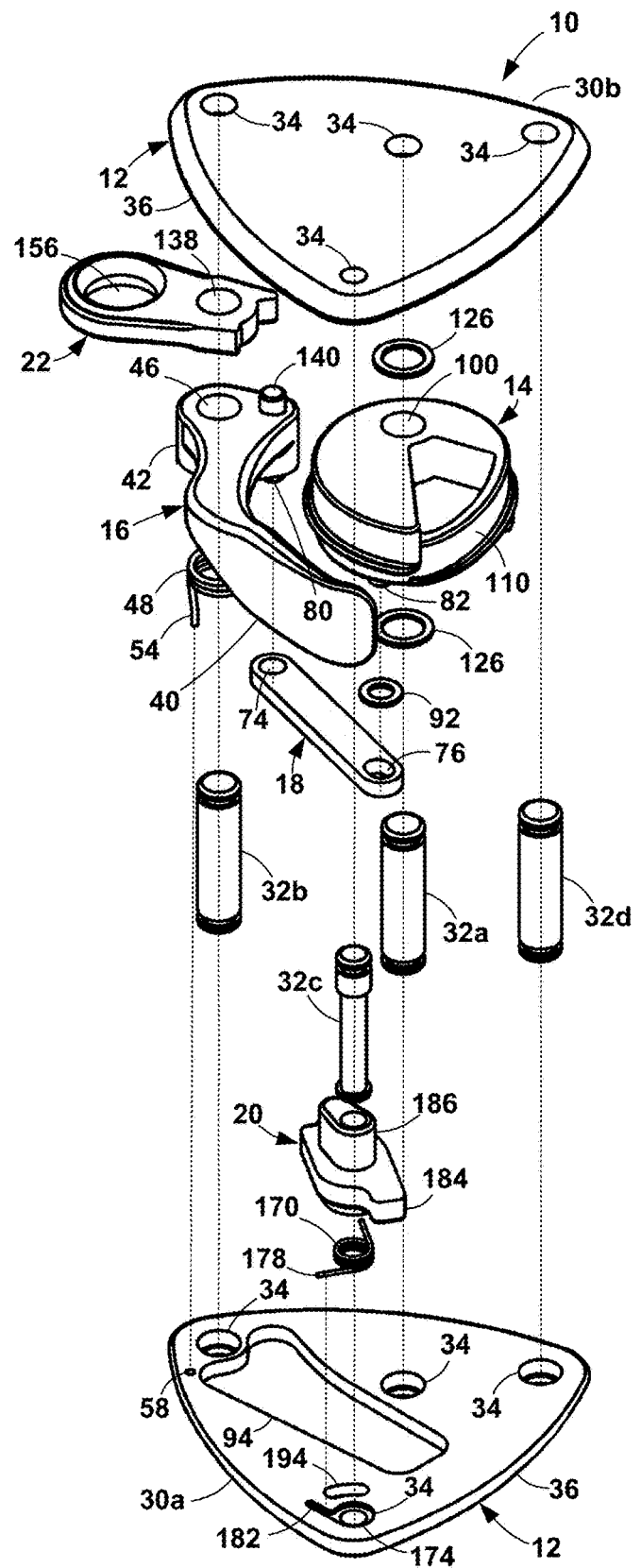
FIG. 4 is an exploded view of the device with the B side up.
Figure 5:
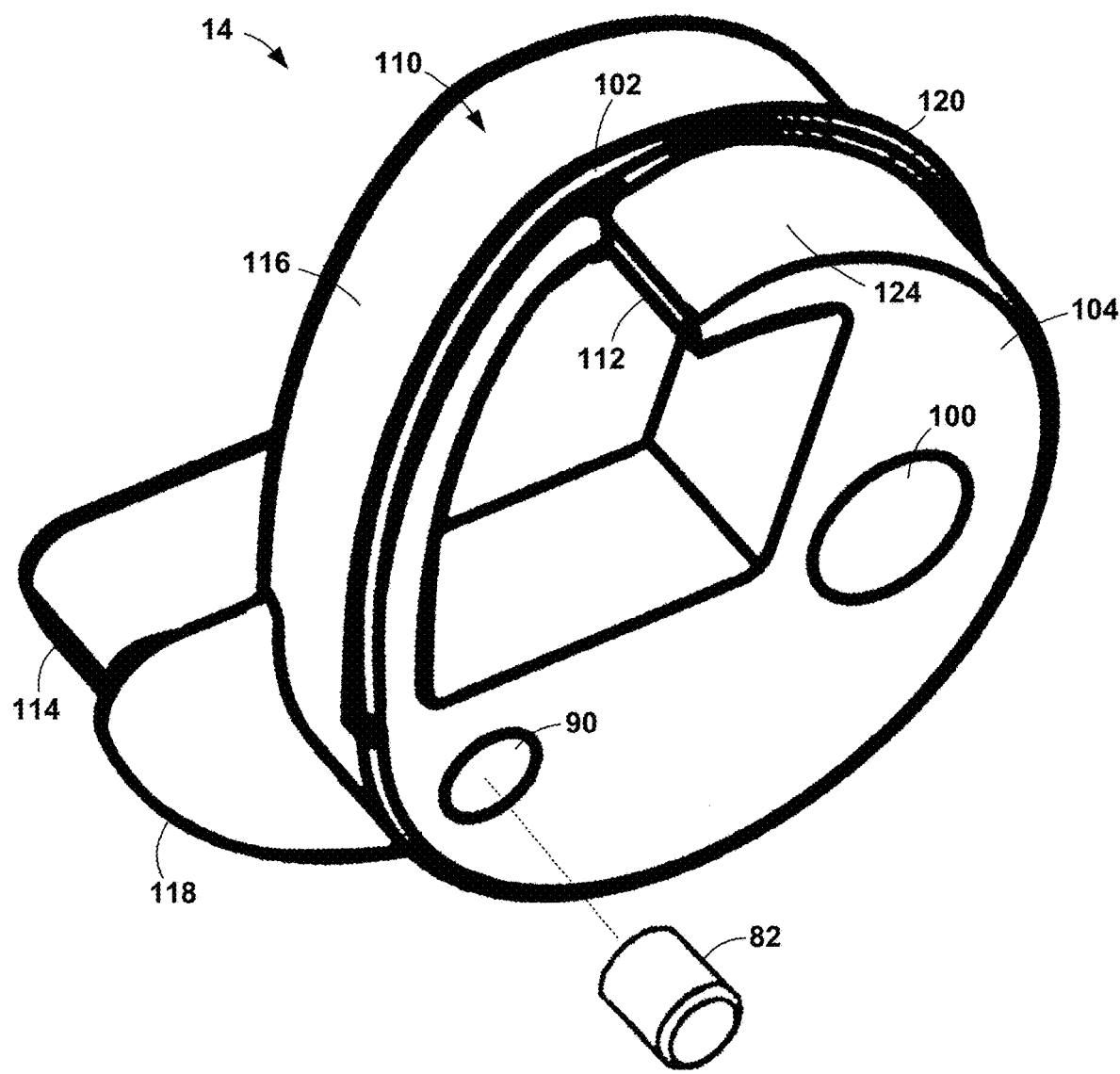
FIG. 5 is an A side perspective view of the cam.
Figure 6:
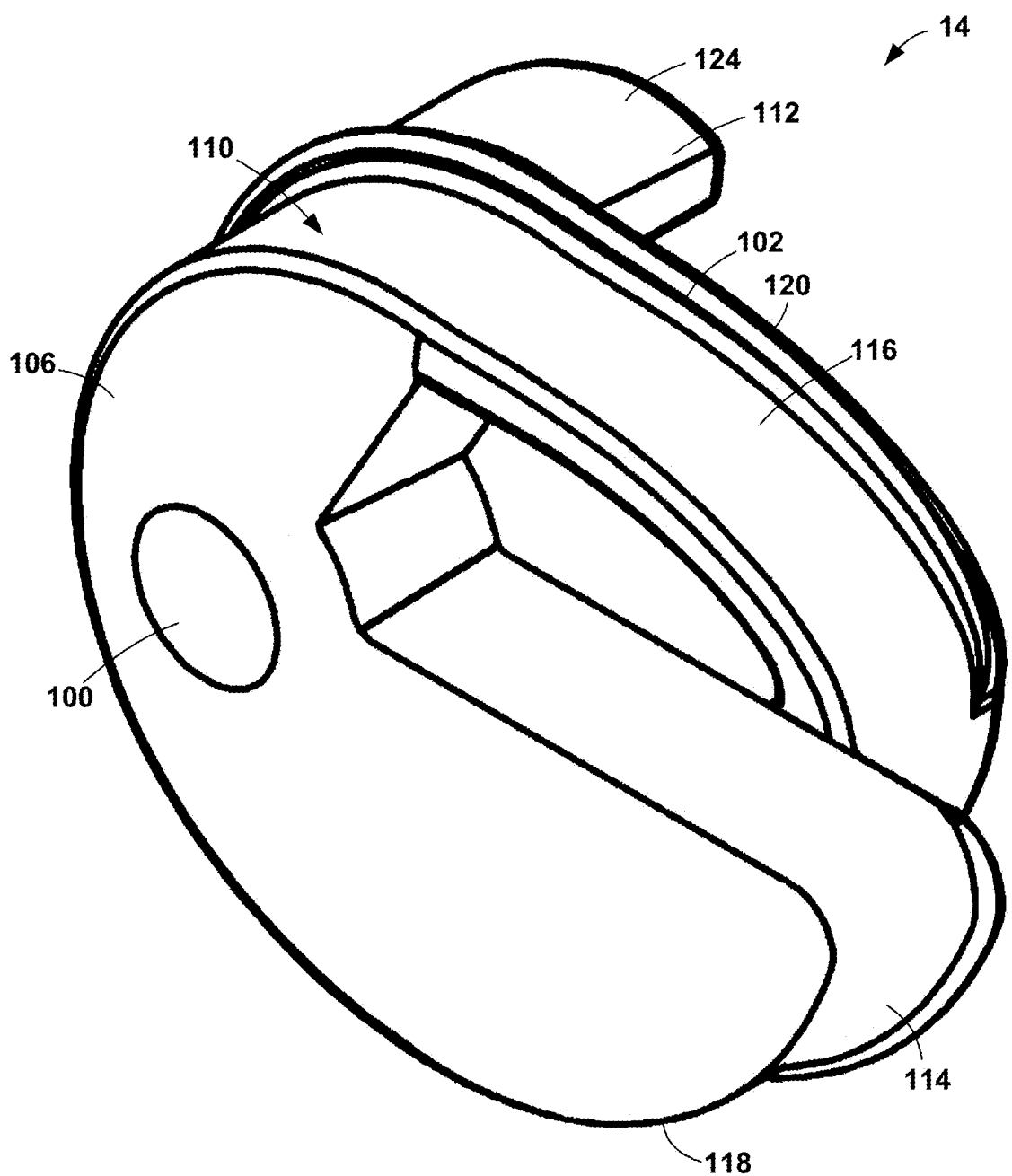
FIG. 6 is a B side perspective view of the cam.

The plates 30 define two sides of the housing 12. The A side is defined by the upper plate 30a in FIG. 3. The B side is defined by the lower plate 30b in FIG. 3. In the present design, the plates 30 are shaped as curvilinear triangles, that is, an equilateral triangle with convex sides. The curvilinear shape is intended to help the device 10 be rocked or turned in case it becomes trapped against a windowsill or similar obstruction. The outer edge of the plates 30 define a perimeter 36.

The plates 30 are rigid, composed of a relatively light weight, high strength material. In the present design, aluminum alloy 7075-T6 is employed, but any other adequate material can be used.

Figure 18:
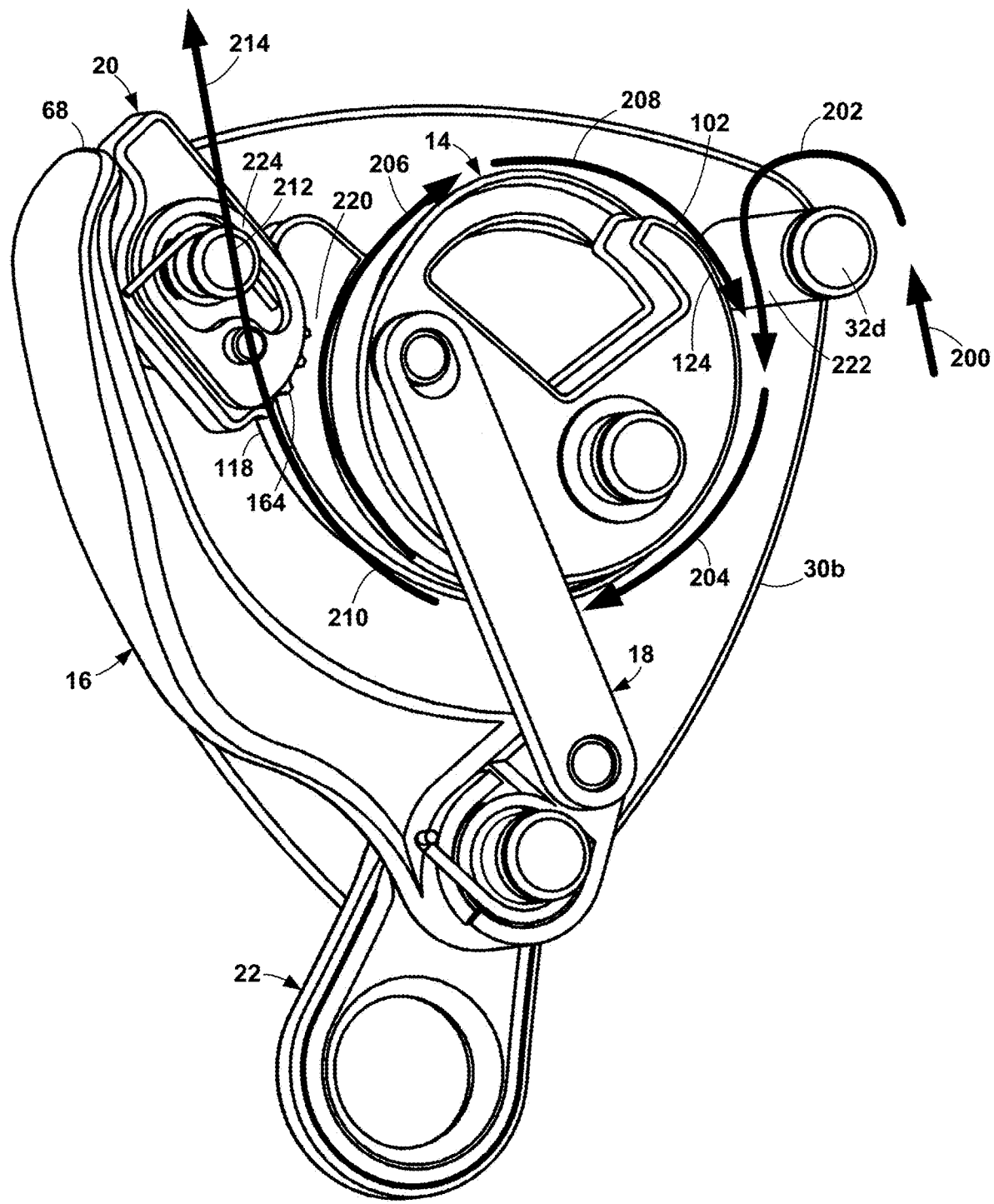
FIG. 18 shows the rope path through the device.

The cam 14, shown in FIGS. 5-9, is a generally circular disc with a number of features. For orientation, the top of the cam 14 in FIGS. 5-9 is referred to as the pinch side 102, as it is adjacent to the pinch spacer 32d when the device 10 is assembled, as can be seen in FIG. 18.

The cam 14 has a rope track 110a, 110b (collectively, 110) that extends around the perimeter 126 of the cam 14 at least 540° but not more than about 650°. A pinch end 112 of the rope track 110a is on the pinch side 102 adjacent to the A side 104 of the cam 14. Between approximately 5° and 20° from the pinch end 112, the A side rope track 110a bumps outwardly to form a hump 124. The hump 124 and the pinch spacer 32d define a pinch point 222 to stop the device 10 from sliding down the rope 2 when the cam 14 has a particular orientation, as described below. From the hump 124, the A side rope track 110a extends around the cam 14 adjacent to the cam A side 104 for between approximately 240° and 280°. Over the next between approximately 80° and 100°, the rope track 110 crosses over to the B side 106 of the cam 14, as at 116. The B side rope track 110b extends around the perimeter 126 of the cam B side 106 for between approximately 130° and 170° to a nose 118 that, over the next between approximately 110° and 140° to a nose end 114, juts radially out from the perimeter 126 between approximately 30% and 70% of the radius of the cam 14. The purpose of the nose 118 is to ease the transition between the straight rope path coming from above to the rope wrapping around the cam 14. The gradual change in radius reduces stress on the rope 2. In the present design, the rope path extends about 630° around the cam 14, although the rope 2 does not necessarily ride in the rope track 110 for the entire 630°.

The surface of the rope track 110 is smooth and has a width 122 designed to permit the rope 2 to easily slip along it. The rope 2 is retained on the A side rope track 110a by the A side plate 30a at the cam A side 104 and the rope is retained on the B side rope track 110b by the B side plate 30b at the cam B side 106. A ridge 120 along the A side of the crossover 116 and separating the A side rope track 110a from the B side rope track 110b retains the rope 2 on the track 110, thereby preventing the rope from crossing over itself.

Figure 7:
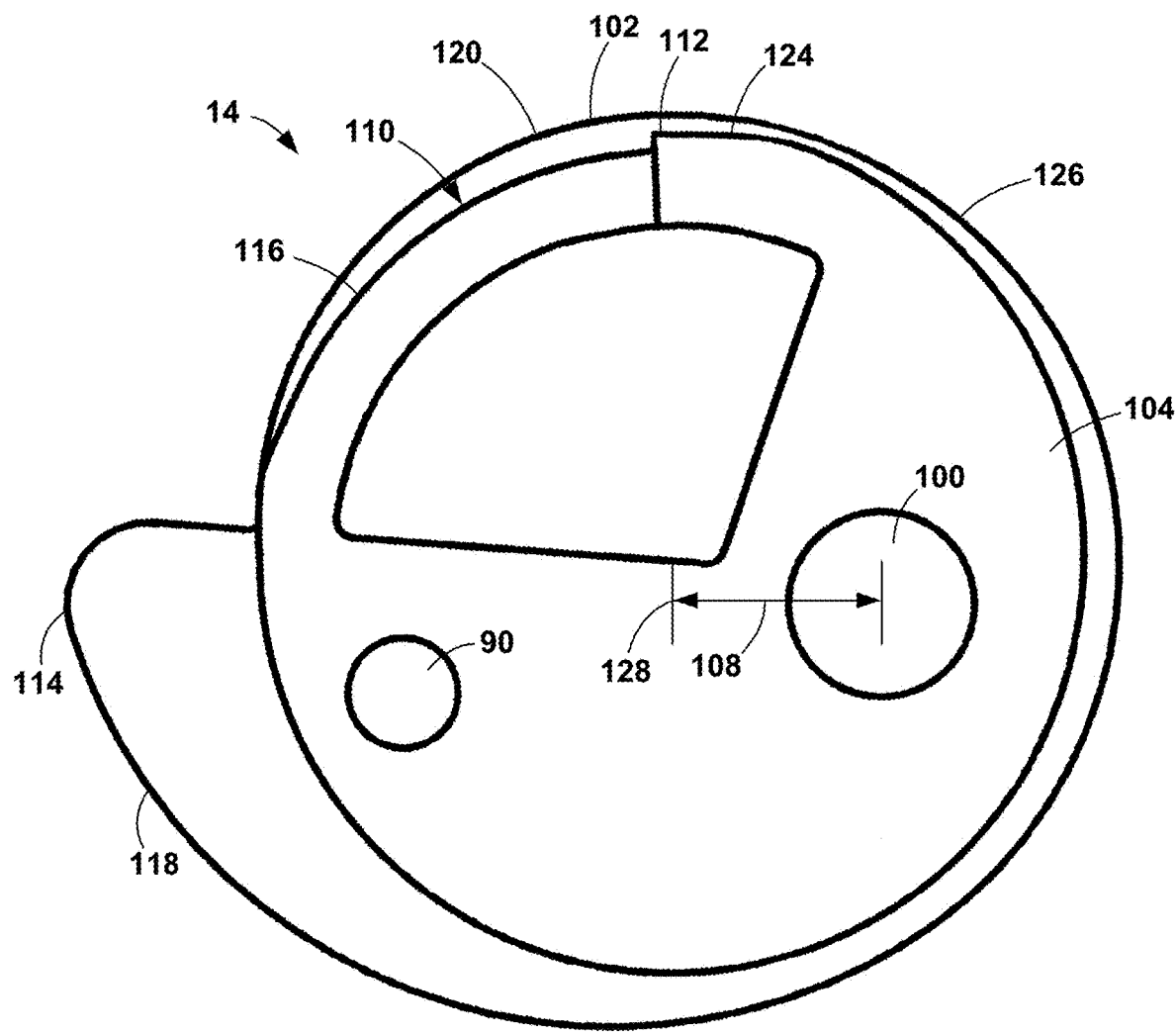
FIG. 7 is an A side view of the cam.
Figure 8:
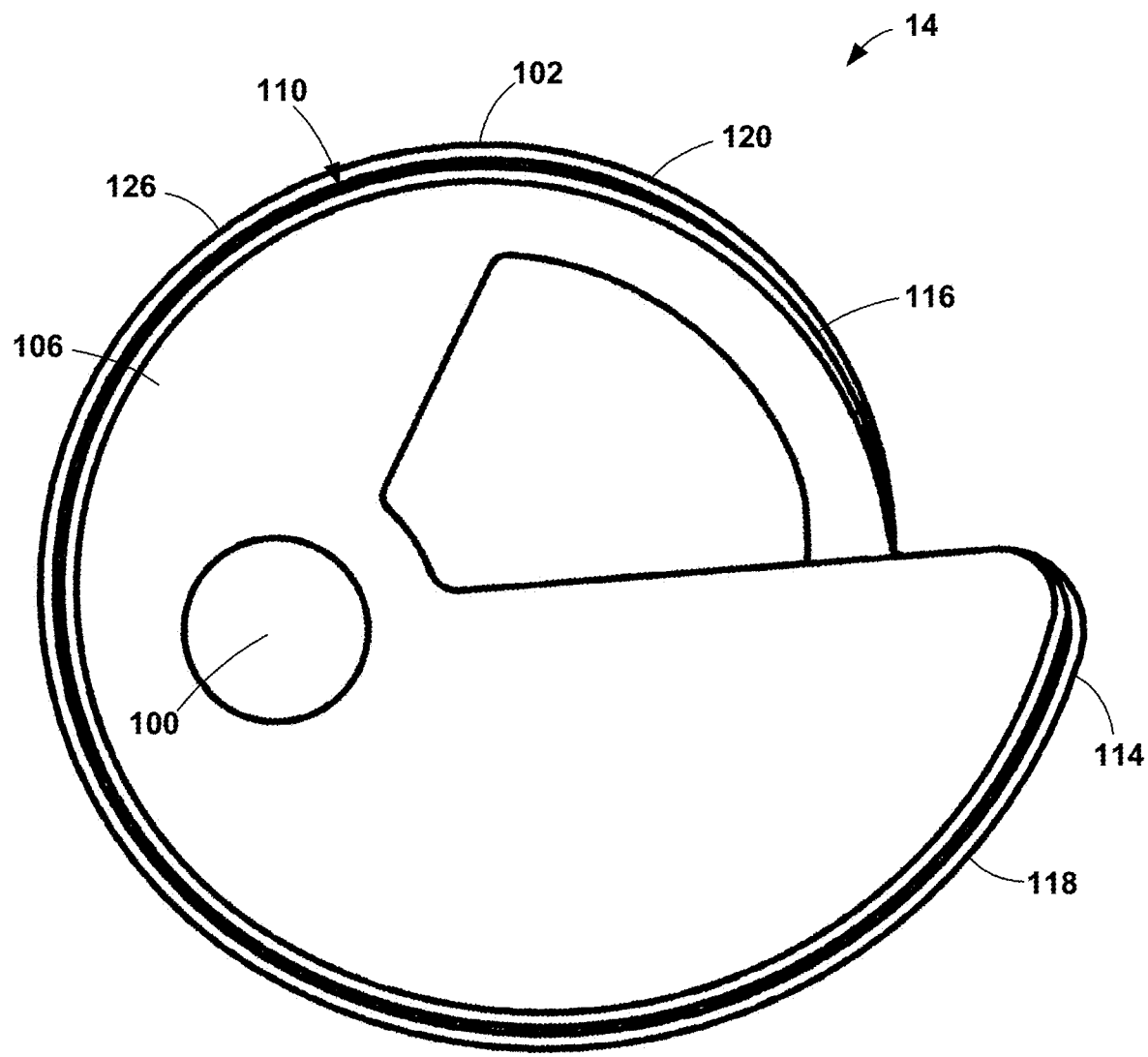
FIG. 8 is a B side view of the cam.

The cam 14 is mounted to rotate on one of the housing spacers, the cam axle 32a, between the plates 30 inside the housing perimeter 36. The cam axle 32a extends through a through hole 100 in the cam 14. As shown in FIG. 7, the through hole 100 is offset from the center 128 by about one half the radius, as at 108, at from approximately 80° and 110° from the pinch end 112 opposite the nose end 114. The hole offset 108 causes the cam 14 to rotate when there is tension on the rope 2, as described below. Optional washers 126 between the cam 14 and the two plates 30 facilitate rotation of the cam 14.

Figure 10:
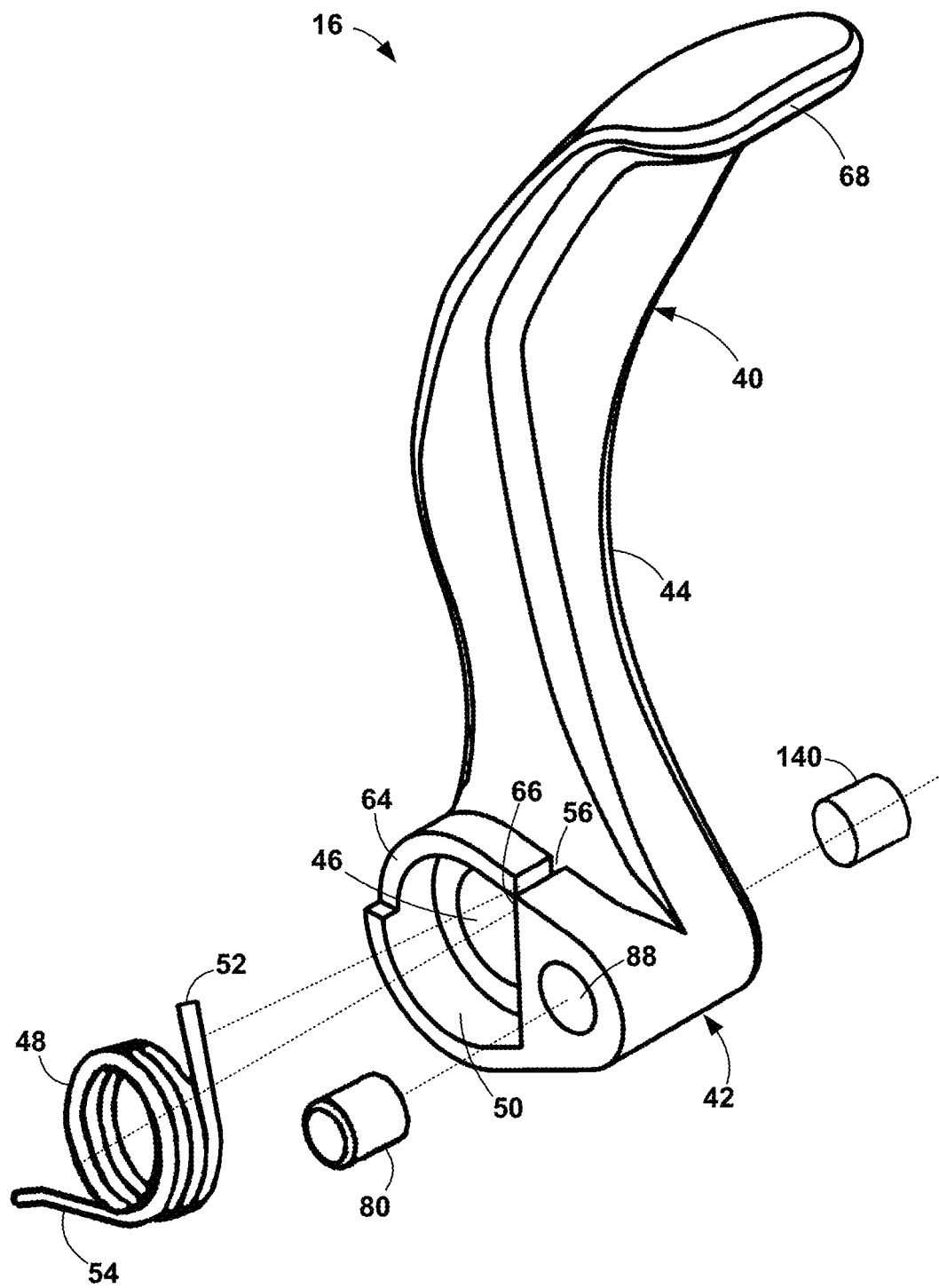
FIG. 10 is an A side perspective view of the lever.
Figure 11:
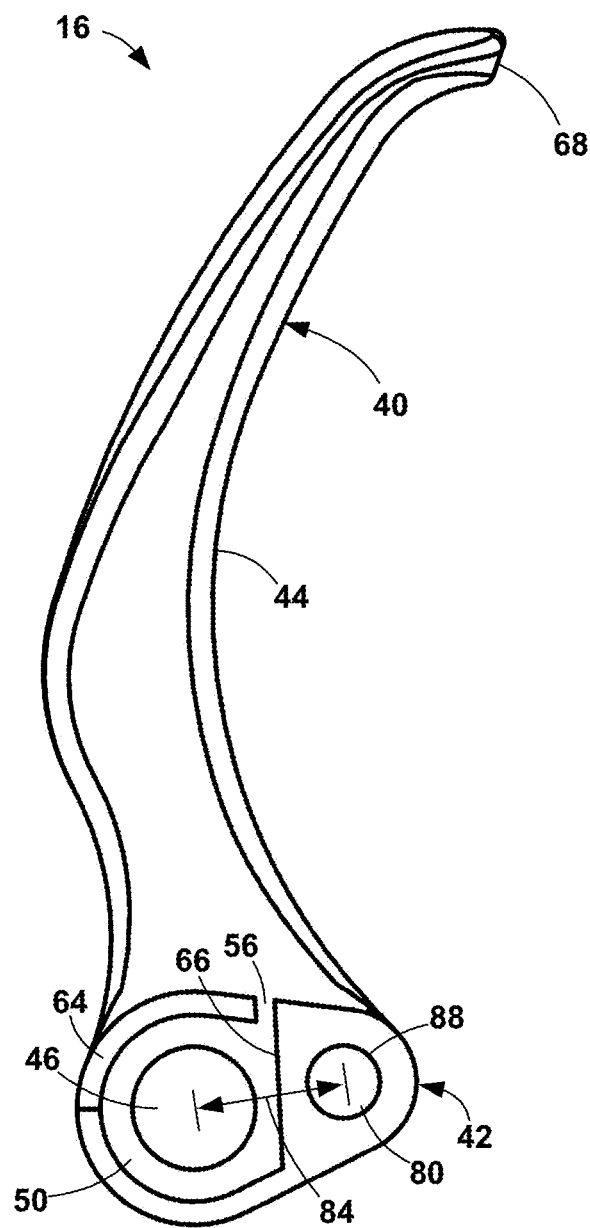
FIG. 11 is an A side view of the lever.
Figure 12:
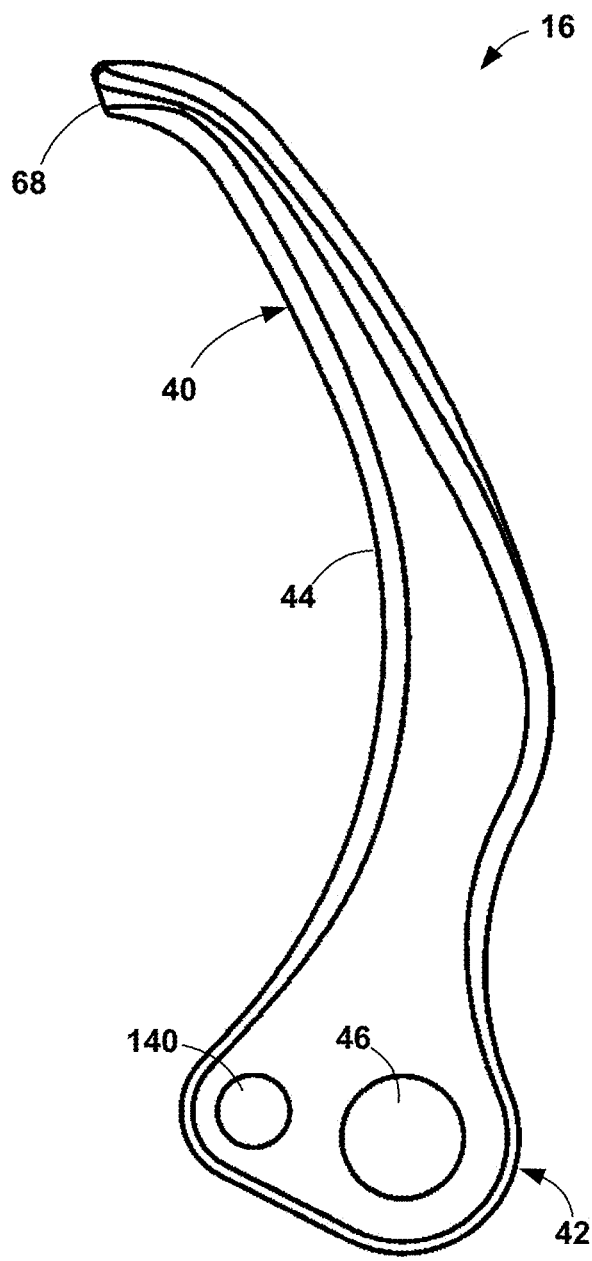
FIG. 12 is a B side view of the lever.

The lever 16, shown in FIGS. 10-12, controls the operation of the device 10. The lever 16 has a handle 40 that curves away from a hub 42, as at 44.

The lever 16 is mounted to rotate on one of the housing spacers operating as the lever axle 32b between the plates 30. The lever axle 32b extends through a through pivot hole 46 in the lever hub 42. The lever 16 rotates between a payout position 130 where the handle generally aligns with the housing perimeter 36 to a payout stop, a braking position 132 where the handle 44 is rotated approximately 39° from the housing 12, and a panic position 134 where the handle 44 is rotated to a panic stop, all of which are described below.

The lever 18 is biased towards the payout position 130 at the housing perimeter 36, that is, when the lever 18 is pulled away from the housing 18 and released, the lever 18 rotates back to the payout position 130. In the present design, the lever 18 is biased by a torsion spring 48. The torsion spring 48 resides within a hollow 50 surrounding the pivot hole 46 so that it is captured by the lever axle 32b. The end of one torsion spring arm 52 is captured by a slot 56 in the side of the hollow 50 and the end of the other arm 54 is captured by a hole 58 in the A side plate 30a. So that the plate captured arm 54 can be long enough to work as desired, the arm 54 extends through an annular depression 64 in the outer rim of the spring hollow 50.

A payout position stop 60 prevents the lever 16 from being rotated beyond the payout position 130. The payout position stop 60 is provided by the brake 20. The location of the brake 20, described below, causes the end 68 of the handle 40 to contact the brake 20, thereby preventing the lever 18 from rotating any farther inwardly unless additional force is applied to the handle 40 to overcome the brake spring 170, as described below. A panic position stop 62 is described in more detail below.

Figure 13:
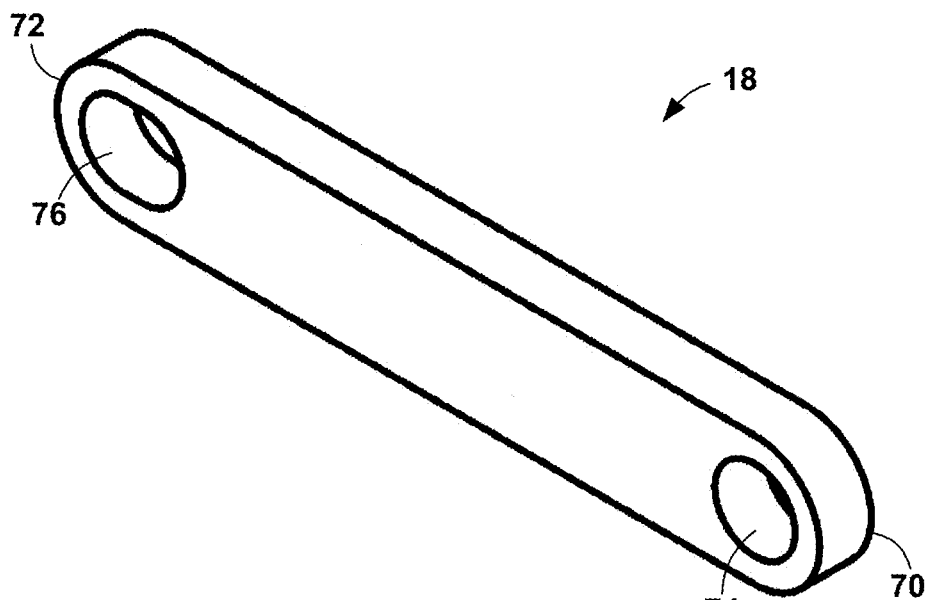
FIG. 13 is a perspective view of the linkage.

The linkage 18, shown in FIG. 13, extends between the lever 16 and the cam 14. The linkage 18 is a length of rigid material with a lever end 70 and a cam end 72. A round lever hole 74 adjacent to the lever end 70 fits onto a cylindrical lever linkage stud 80 on the lever hub 42 that is at an offset distance 84 from the center of the pivot hole 46. The offset distance 84 determines, in part, how much the cam 14 is caused to rotate by the lever 18, as described below. The lever hole 74 and lever linkage stud 80 are sized so that the linkage 18 can easily rotate on the lever linkage stud 80. In the present design, the lever linkage stud 80 is a separate component that is press fit into a hole 88, as in FIG. 10. Alternatively, the lever linkage stud 80 can be an integral component of the lever 16, that is, formed with the lever 16. Alternatively, the lever hole 74 and lever linkage stud 80 are reversed, that is, the hole 74 is on the lever 16 and the stud 80 is on the linkage 18.

A cam slot 76 at the cam end 72 fits onto a cam linkage stud 82 on the cam 14 that is at an offset distance 86 from the center of the pivot hole 100. The offset distance 86 determines, in part, how much the cam 14 is caused to rotate by the lever 18, as described below. The cam slot 76, as opposed a round hole, helps allow the lever 16 to rotate through its full range of motion relative to the cam 14. A round hole can bind through parts of the range when the cam is under load from the tension on the rope.

The cam slot 76 and cam linkage stud 82 are sized so that the linkage 18 can easily rotate on the cam linkage stud 82. In the present design, the cam linkage stud 82 is a separate component that is press fit into a hole 90, as in FIG. 5. Alternatively, the cam linkage stud 82 can be an integral component of the cam 14, that is, formed with the cam 14. Alternatively, the cam slot 76 and cam linkage stud 82 are reversed, that is, the slot 76 is on the cam 14 and the stud 82 is on the linkage 18.

Optionally, a metal spacer 92 separates the cam 14 from the linkage 18.

To avoid interference with the rope path, the linkage 18 resides and moves within a shallow depression 94 in the A side plate 30a. The linkage 18 is retained on the linkage studs 80, 82 by the A side plate 30a when the device 10 is assembled.

The linkage 18 residing in the depression 94 operates as a stop for the linkage 18 and the panic position stop 62 for the lever 16. The depression 94 is shaped so that the "highest" position of the cam 14 is in the middle of the range of travel of the lever 16. In other words, once the cam 14 is locked against the rope 2, the lever 16 can be either pulled outward or pushed inward to rotate the cam 14 away from the rope 2.

Figure 9:
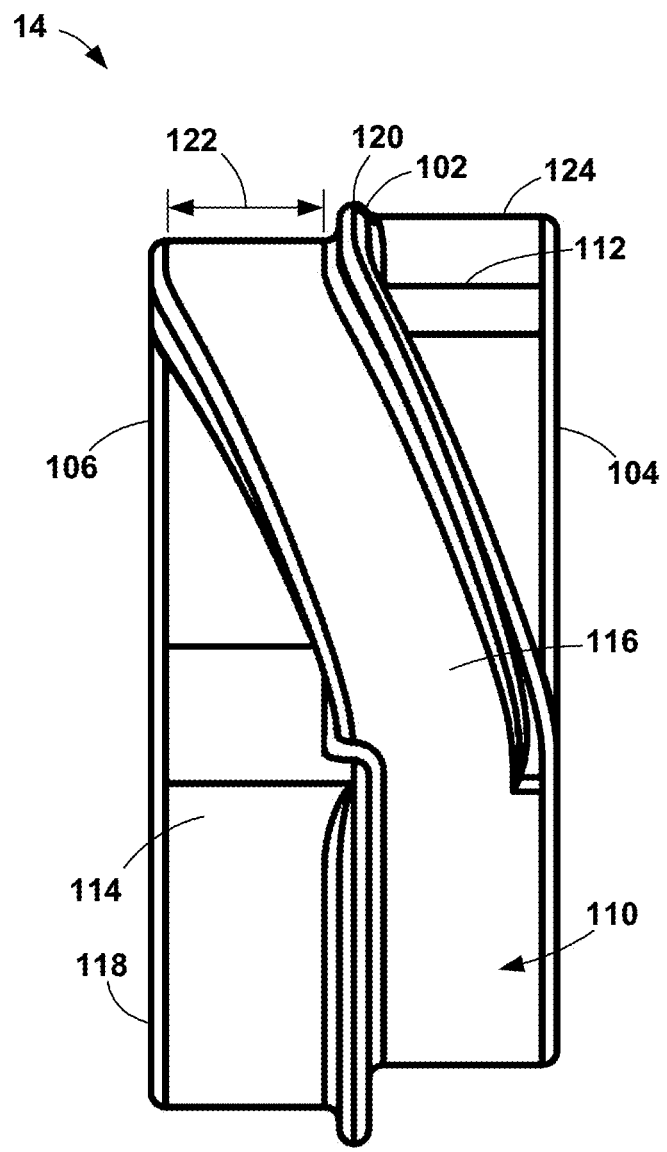
FIG. 9 is an edge view of the cam.
Figure 14:
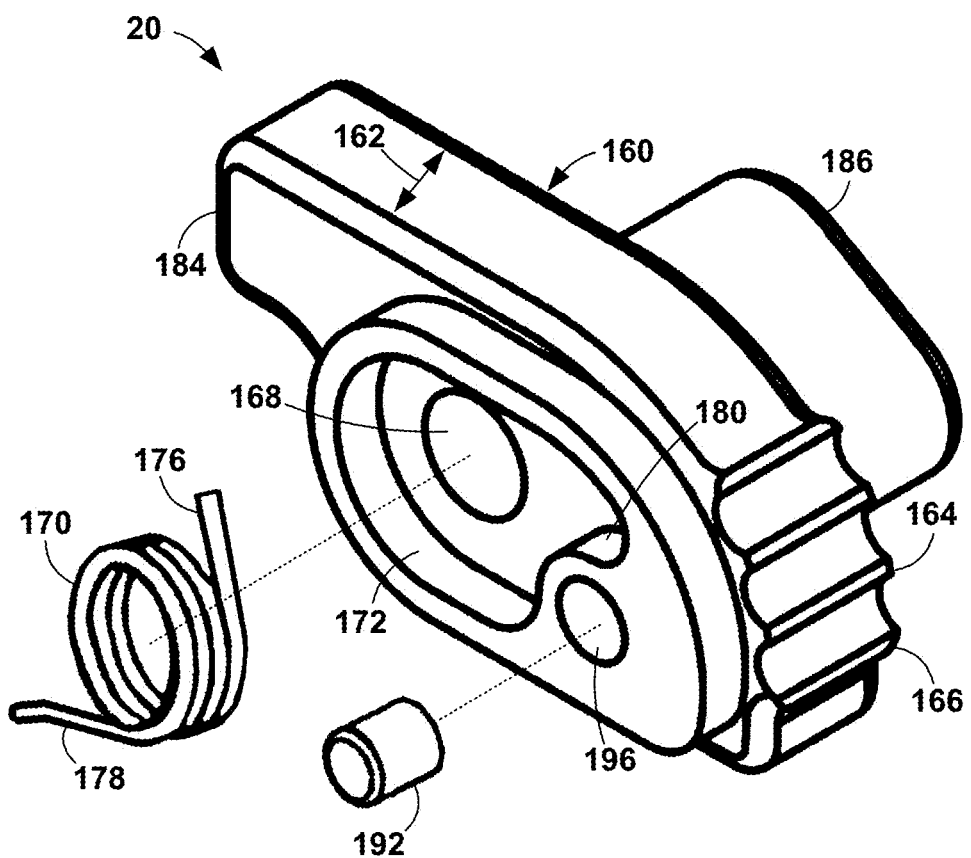
FIG. 14 is an A side perspective view of the brake.
Figure 15:
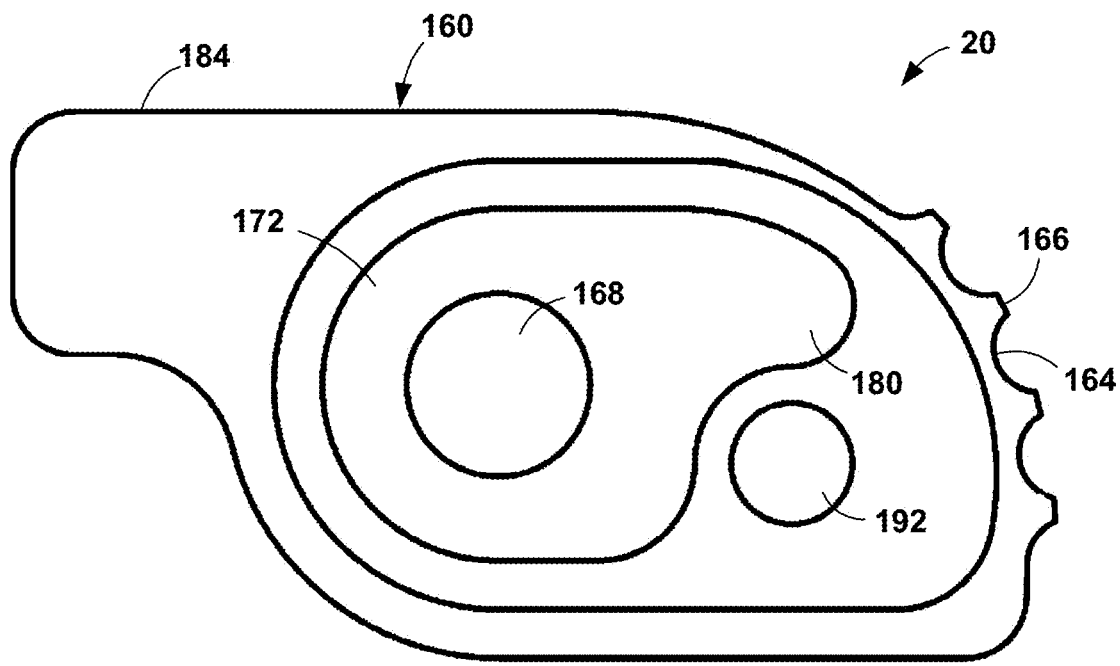
FIG. 15 is an A side view of the brake.
Figure 16:
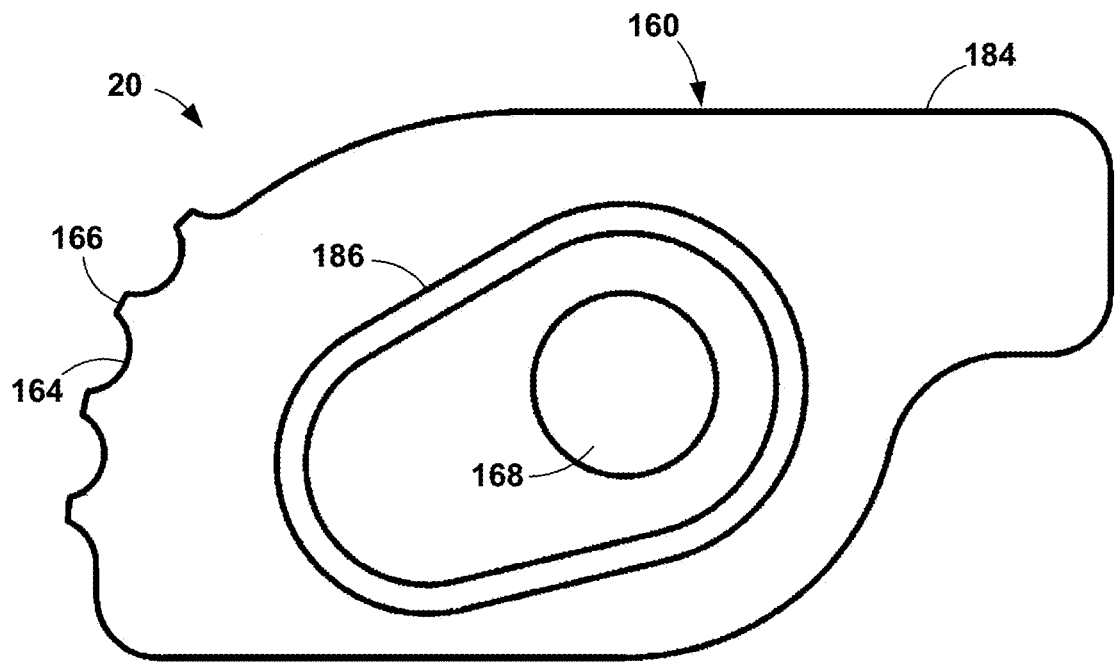
FIG. 16 is a B side view of the brake.

The brake 20, shown in FIGS. 14-16, has a generally oval body 160 with a thickness 162 approximately the width 122 of the rope track 110 shown in FIG. 9. One end of the body 160 is a rounded cleat 164 that is positioned to create a cleat gap 220 with the A side rope track 110a just before the crossover 116 to the B side. The cleat 164 contacts the rope 2 extending through the cleat gap 220. Optionally, the cleat 164 is textured to better apply non-slip pressure to the rope 2, as described below. In the illustrated configuration, the texturing includes lateral ridges 166.

A finger 184 extends from the body 160 opposite the cleat 164. When the device 10 is assembled, the finger 184 extends outside of the housing interior 38 and operates as the payout position stop 60 for the lever 16.

The brake 20 is mounted to rotate on one of the housing spacers operating as the brake axle 32c between the plates 30. The brake axle 32c extends through a pivot hole 168 in the brake 20. The pivot hole 168 is offset from the center of the body 160 away from the cleat 164.

The brake 20 is biased such that the cleat 164 is biased towards the cam 14. In the present design, the brake 20 is biased by a torsion spring 170. The torsion spring 170 resides within a compartment formed by a hollow 172 surrounding the pivot hole 168 and a depression 174 in the A side plate 30a so that it is captured by the brake axle 32c. One torsion spring arm 176 is captured by a finger 180 in the side of the hollow 172 and the other torsion spring arm 178 is captured by a finger 182 in the plate depression 174.

A brake spacer 186 extending from the B side of the body 160 keeps the body 160 properly aligned with the A side rope track 110a. The brake spacer 186 has an eccentric shape about the brake axle 32c that operates as a cam. The brake spacer 186 keeps the cleat 164 from becoming jammed against the rope 2. When the handle 40 is released, the rope 2 puts pressure on the brake spacer 186, thereby rotating the brake cleat 164 away from the rope 2.

Stops limit the amount that the brake 20 can pivot on the brake axle 32c to prevent the brake from becoming too tightly jammed against the rope where it is unable to be released. In the present design, the brake stops are formed by a pin 192 extending from the A side of the body 160 offset from the pivot hole 168 towards the cleat 164 and into a curved slot 194 in the A side plate 30a. The pin 192 hitting the ends of the slot 194 limit the brake pivot. In the present design, the pin 192 is a separate component that is press fit into a hole 196 in the brake body 160. Alternatively, the pin 192 can be an integral component of the brake 20, that is, formed with the brake 20. Alternatively, the pin 192 and the slot 194 are reversed, that is, the pin 192 is in the plate 30a and the slot 194 is in the brake body 160.

Figure 17:
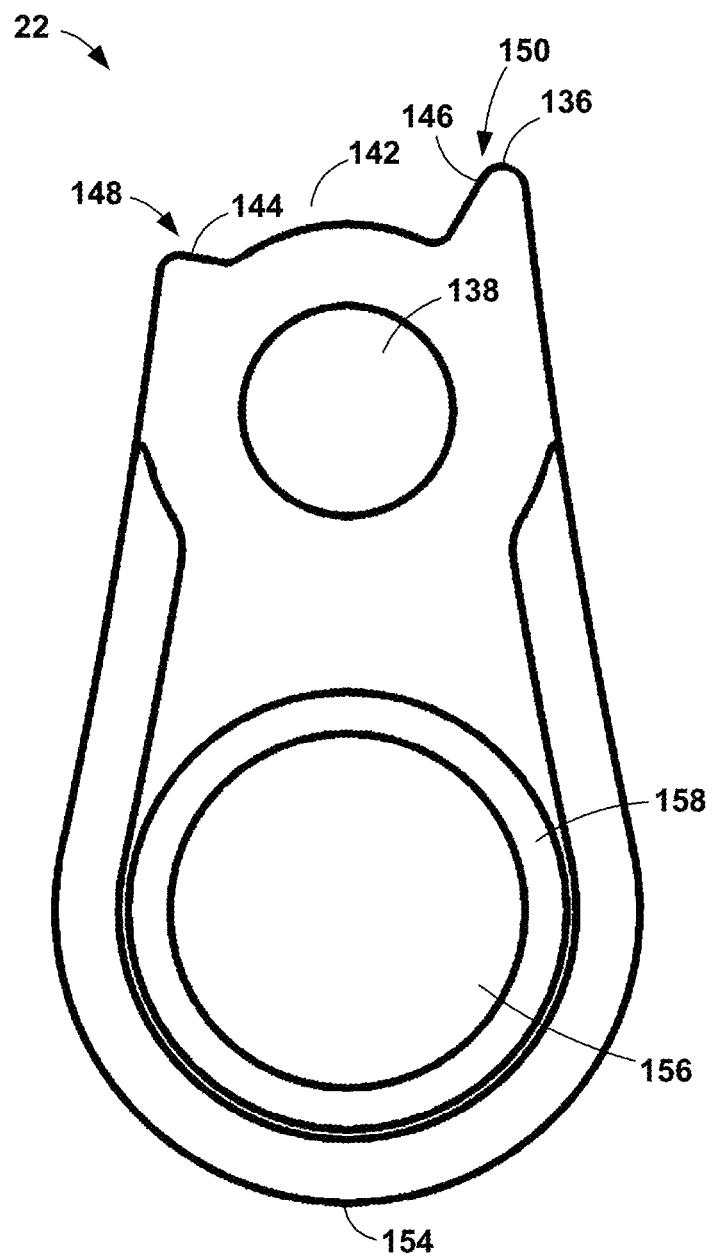
FIG. 17 is an A side view of the eye.

The eye 22, shown in FIG. 17, provides a hook up point for a carabiner or the like. The eye 22 is a flat, elongated piece of rigid material. The eye 22 is mounted by a pivot hole 138 adjacent to one end 136 to pivot on the lever axle 32b between two eye stops 148, 150. The eye stops 148, 150 are formed by a pin 140 extending from the lever hub 42 that rides in a curved groove 142 in the pivot end 136 of the eye 22. The eye 22 stops pivoting when the pin 140 reaches an end 144, 146 of the groove 142. Because the pin 140 is on the lever 16, the relative position of the lever 16 to the housing 12 depends on the position of the eye 22. With this design, the user's body weight on the eye 22 pushes the pin 140 against the groove end 146, thereby forcing the lever 16 to extend out from the housing 12, making it easier for the user to grab. This also ensures that when the device 10 is weighed down by the user, the user cannot squeeze the lever 16 in enough to override the brake 20 because they will be fighting against their own body weight.

An attachment hole 156 at the attachment end 154 of the eye 22 provides the hook up point. The attachment hole 156 is typically round and large enough for a large carabiner to attach to. The inside wall 158 of the attachment hole 156 is curved toward the center of the hole 156 to eliminate sharp edges.

The main purpose of the device 10 is to control the descent of a person on a rope 2 that is fixed to an anchor point above. The device 10 provides control over a person's descent through different positions of the handle 40. The different handle positions are shown in FIGS. 19-24.

The path that the rope 2 takes through the device 10 is shown in FIG. 18, starting with the rope 2 coming up from below. When in use, the device 10 will descend the rope 2, so the rope 2 will move through the device 2 in the direction described as the rope path. The rope 2 enters the device 2 by wrapping about 180° around the pinch spacer 32d, as at 202, runs through the pinch point 222 between the hump 124 and the pinch spacer 32d, and enters the A side rope track 110a at the hump 124. The rope 2 continues around the A side rope track 110a, as at 204, until it passes through the cleat gap 220 between the A side rope track 110a and the brake cleat 164 and then crosses over to the B side rope track 110b, as at 206. The rope 2 continues around the B side rope track 110b, as at 208, to the nose 118, as at 210, where it goes through a nose gap 224 between the brake spacer 186 and the nose 118, as at 212. After the nose gap 224, the rope 2 continues straight out of the device 10, as at 214, to the anchor point above the user.

Figure 19:
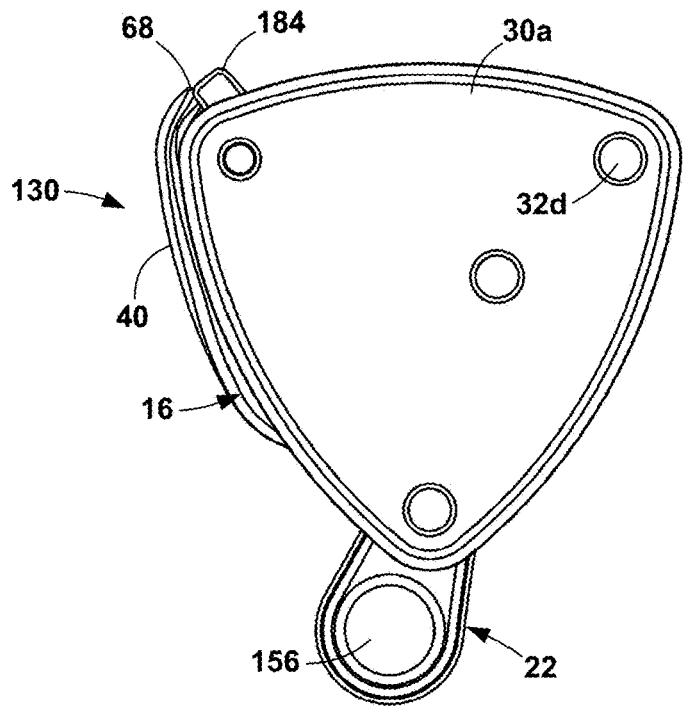
FIG. 19 shows the device in the payout position.
Figure 20:
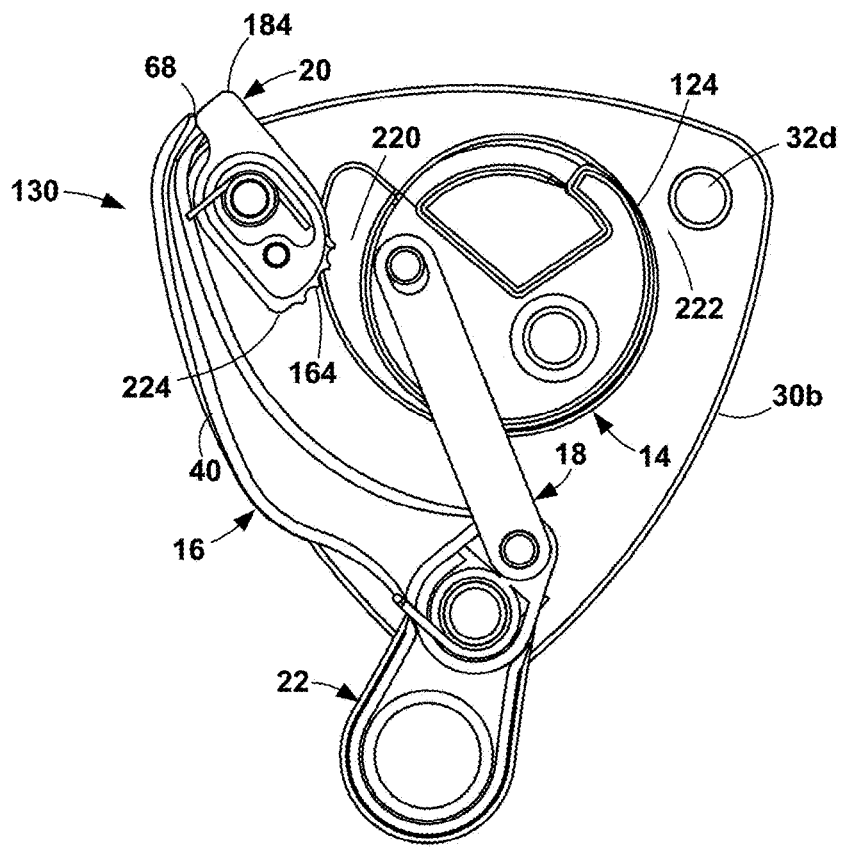
FIG. 20 shows the inner components of the device in the payout position.

In the payout position 130 of FIGS. 19 and 20, the handle 40 is aligned with the housing perimeter 36 and the end 68 of the handle 40 is in contact with the brake finger 184, thereby pivoting the brake cleat 164 away from the cam 14. The cleat gap 220 between the brake cleat 164 and the A side rope track 110a just before the cross over 118 is wide enough to enable the rope 2 slide through without being impeded. Also, the hump 124 is not aligned with the pinch spacer 32d so that the pinch point 222 is wide enough that the rope 2 is not impeded. The device 10 is able to move freely on the rope 2.

In the payout position 130, the brake can also be overridden by squeezing the handle 40 inward against the finger 184. This allows the user to feed rope 2 through the device 10 with minimal friction, which is sometimes necessary based on where the rope 2 is anchored. This can only be done when the user is not hanging from the device 10.

If the user needs to take rope 2 in, as when moving closer to the anchor point or re-setting after a descent, the slack end of the rope 2 can be pulled upward to feed the rope 2 through the device 10 in the opposite direction. It is not necessary to operate the lever 16 to accomplish this.

Figure 21:
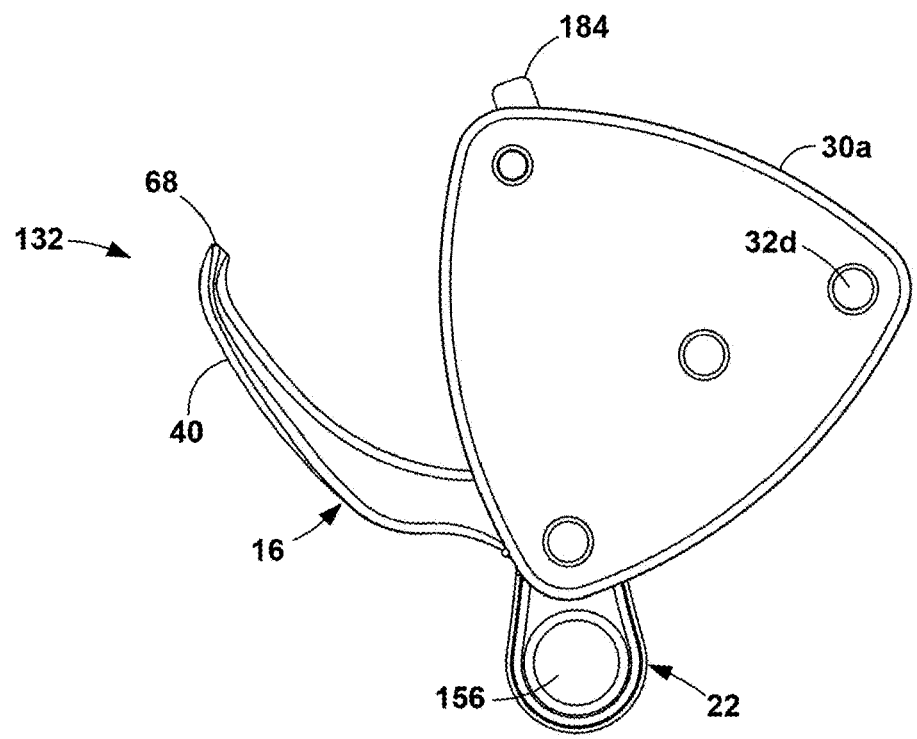
FIG. 21 shows the device in the braking position.
Figure 22:
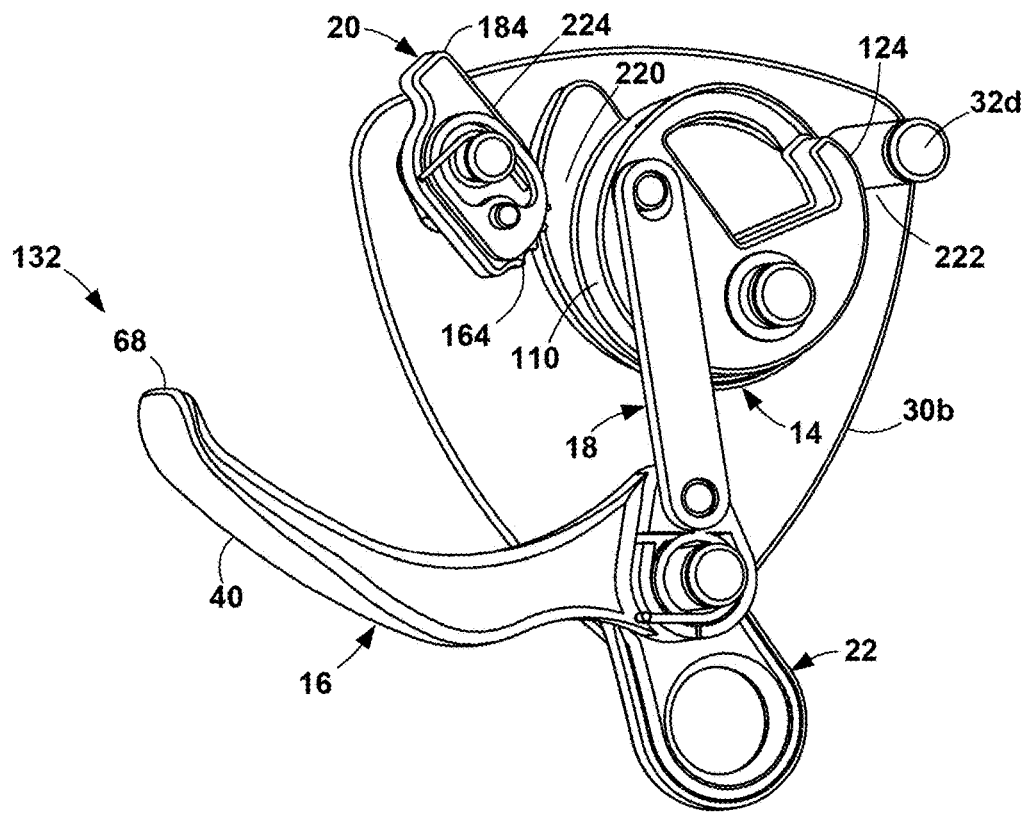
FIG. 22 shows the inner components of the device in the braking position.

In the braking position 132 of FIGS. 21 and 22, a person is attached to the device 10 at the eye attachment hole 156, thereby pulling the eye 22 as shown in FIG. 21. Because of the eye stop 150, when the eye 22 pivots to the position shown in FIG. 21, the lever 16 is pivoted out of the housing 12 approximately 39°, causing the linkage 18 to rotate the cam 14 clockwise. This has two effects. First, the hump 124 is aligned with the pinch spacer 32d, causing the pinch point 222 to narrow so that the rope 2 is pinched therebetween. This is the primary braking mechanism of the device 10 and is capable of completely stopping descent. Second, the brake spring 170 is no longer prevented from pivoting the brake cleat 164 towards the cam 14, so the cleat 164 is lightly contacting the rope 2 in preparation to engage the rope 2, if necessary.

In general, the device 10 is in the braking position 132 when the lever 16 is pivoted out of the housing 12 to where the pinch point 222 is at its narrowest, in the current design, at approximately 39°. In operation, braking begins when the rope 2 begins to be impeded by the narrowing pinch point 222 before the 39° angle. Within this arc is a smaller arc, ranging from about 35° to 45°, where there is sufficient pinch pressure on the rope 2 to provide a near complete to complete brake on the descent.

As the user pulls the handle 40 downwardly, the cam 14 rotates counterclockwise, moving the position of the hump 124 and widening the pinch point 222, thereby lessening the pinching of the rope 2. The user can control the descent by how much the handle 40 is pulled downwardly. The user can also apply additional friction by using their other hand to grip the rope below the device, preferably with a gloved hand. This is a standard safety practice and is recommended for most descent control devices of this nature.

The actual braking operation depends inter alia on the diameter of the rope 2 and on the parameters of the cam and 14 and pinch spacer 32d.

Figure 23:
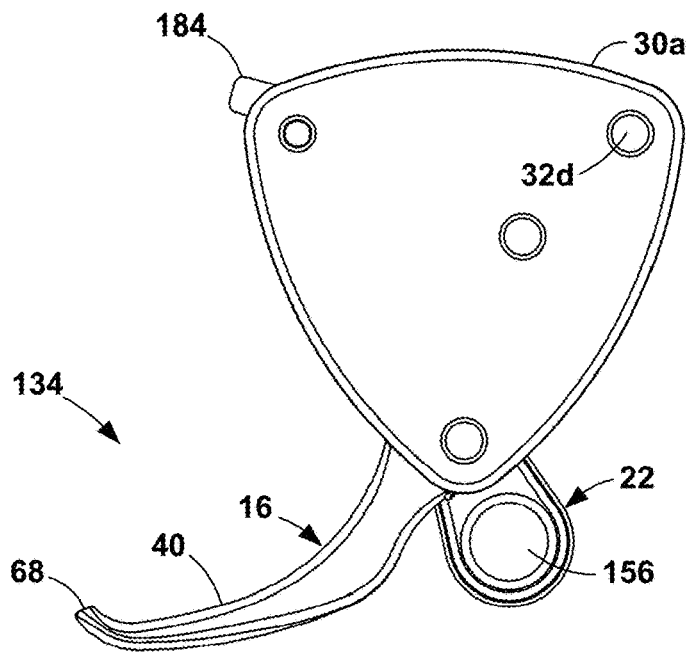
FIG. 23 shows the device in the panic position.
Figure 24:
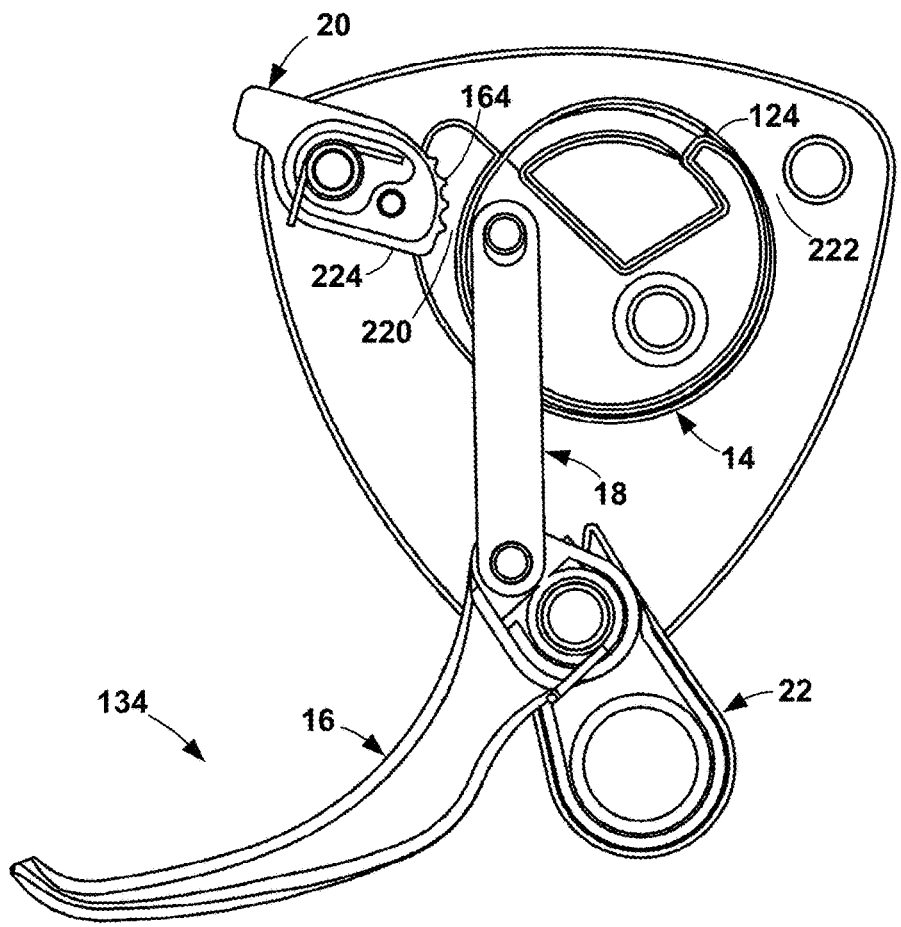
FIG. 24 shows the inner components of the device in the panic position.

If the handle 40 is pulled all the way down, as at 134 in FIGS. 23 and 24, the cam 14 is rotated to narrow the brake cleat gap 220, and the rope 2 is pinched between the cam 14 and the brake cleat 164, thereby slowing descent. This is referred to as the "panic position" because a user may reflexively pull the handle 40 harder if they feel that they are falling too fast.

The device 10 is capable of self-deployment is the it is caught against a wall, windowsill, or other similar obstruction where the user cannot operate the handle 40. Pressure of the device 10 against the obstruction pushes the handle 40 inwardly, causing the cam rotate counterclockwise and partially releasing the rope 2 in the gap 22 between the hump 124 and pinch spacer 32d. Once the device 10 has moved along the rope 2 sufficiently past the obstruction, the handle 40 extends again to the brake position and the device 10 stops until further action is taken by the user (i.e., it does not automatically continue to descend).

Thus, it has been shown and described a descent control device. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A descent control device adapted to attach to a rope, the descent control device comprising:
    (a) housing including an A side plate defining an A side and a parallel opposed B side plate defining a B side, the plates spaced apart and attached together by at least four spacers, four of the at least four spacers denoted as a cam axle, a lever axle, a brake axle, and a pinch spacer, the housing having a perimeter;
    (b) a cam being a generally circular disc with a perimeter, a cam A side adjacent to the A side plate, and a cam B side adjacent to the B side plate, the cam mounted to rotate on the cam axle extending through an offset through hole, the cam having a rope track extending around the perimeter from a pinch end on the cam A side to a nose end on the cam B side, the rope track extending between approximately 5° and 20° from the pinch end on the cam A side to a hump on the rope track, the hump defining a pinch point with the pinch spacer, the rope track extending between approximately 240° and 280° from the hump to a crossover to cam B side over between approximately 80° and 100°, where the rope track extends between approximately 130° and 170° to a nose, the nose jutting radially away from the perimeter over between approximately 110° and 140° to the nose end, the offset through hole being between approximately 80° and 110° from the pinch end opposite the nose end;
    (c) a lever having a hub and a handle extending therefrom, the lever hub mounted to rotate on the lever axle between a payout position wherein the handle generally aligns with the housing perimeter, a braking position, and a panic position, the lever being biased to the payout position;
    (d) a linkage extending between the cam and the lever and rotatably attached to the cam and lever hub such that, when the lever is in the payout position, the descent control device is able to move freely on the rope without being impeded, when the lever is in the braking position, the rope is pinched tightly at the pinch point so that the descent control device is locked in place on the rope, and when the lever is in the panic position, the brake engages the rope to prevent the descent control device from moving too quickly on the rope if the user pulls the lever too hard;
    (e) a brake with a generally oval body rotatably mounted on the brake axle, the body having a rounded cleat, the brake being positioned such that the cleat creates a cleat gap with the rope track on the A side, the brake being biased such that the cleat is biased toward the cam; and
    (f) an eye mounted to rotate on the lever axis between eye stops, the eye having an attachment hole outside the housing perimeter.

2. The descent control device of claim 1 wherein the plates and a ridge separating the A side rope track and B side rope track are adapted to retain a rope on the rope track.

3. The descent control device of claim 1 wherein the offset through hole is approximately one half a radius of the cam from the cam center.

4. The descent control device of claim 1 wherein the brake body has a finger extending from the body opposite the cleat and extending from the housing perimeter.

5. The descent control device of claim 4 wherein the brake finger operates as a payout position stop for the lever.

6. The descent control device of claim 1 wherein the linkage resides within a depression in the A side plate.

7. The descent control device of claim 6 wherein the linkage within the depression operates as a panic position stop for the lever.

8. The descent control device of claim 1 wherein the linkage is rotatably attached to the hub by a cylindrical stud in a round hole and the linkage is rotatably attached to the cam by a cylindrical stud in a slot.

9. The descent control device of claim 1 wherein the cleat is textured.

10. The descent control device of claim 1 wherein a brake spacer extends from the brake body toward the B side plate and centers the cleat on the A side rope track.

11. The descent control device of claim 1 further comprising brake stops adapted to prevent the brake from becoming too tightly jammed against the rope.

12. The descent control device of claim 1 wherein a pin extends from the lever hub into a curved groove with ends on the eye, and wherein the eye stops are provided by the pin reaching the ends of the groove.

* * * * *